United States Patent
Perego et al.

(10) Patent No.: US 8,378,216 B2
(45) Date of Patent: Feb. 19, 2013

(54) ENERGY CABLE

(75) Inventors: Gabriele Perego, Milan (IT); Sergio Belli, Milan (IT)

(73) Assignee: Prysmian S.p.A., Milan (IT)

( * ) Notice: Subject to any disclaimer, the term of this patent is extended or adjusted under 35 U.S.C. 154(b) by 696 days.

(21) Appl. No.: 12/312,464

(22) PCT Filed: Nov. 15, 2006

(86) PCT No.: PCT/EP2006/068526
§ 371 (c)(1),
(2), (4) Date: Jan. 25, 2010

(87) PCT Pub. No.: WO2008/058572
PCT Pub. Date: May 22, 2008

(65) Prior Publication Data
US 2010/0126756 A1    May 27, 2010

(51) Int. Cl.
*H01B 7/00* (2006.01)
(52) U.S. Cl. .................. 174/110 R; 174/120 R
(58) Field of Classification Search .............. 174/36, 174/110 R, 113 R, 115, 116, 120 R, 120 C, 174/120 SC; 29/876
See application file for complete search history.

(56) References Cited

U.S. PATENT DOCUMENTS

| | | | | |
|---|---|---|---|---|
| 6,359,231 B2* | 3/2002 | Reece et al. | ............. | 174/110 R |
| 6,664,476 B2* | 12/2003 | Belli et al. | ............. | 174/120 R |
| 7,105,749 B2* | 9/2006 | Belli et al. | ............. | 174/110 R |
| 7,459,635 B2* | 12/2008 | Belli et al. | ............. | 174/110 R |
| 7,884,284 B2* | 2/2011 | Perego et al. | ............. | 174/110 R |
| 7,999,188 B2* | 8/2011 | Perego et al. | ............. | 174/120 R |

FOREIGN PATENT DOCUMENTS

| | | |
|---|---|---|
| WO | WO 02/03398 A * | 1/2002 |
| WO | WO 02/03398 A1 | 1/2002 |
| WO | WO 02/27731 A1 | 4/2002 |
| WO | WO 02/47092 A1 | 6/2002 |
| WO | WO 2004/066318 A1 | 8/2004 |

* cited by examiner

*Primary Examiner* — William Mayo, III
(74) *Attorney, Agent, or Firm* — Finnegan, Henderson, Farabow, Garrett & Dunner, L.L.P.

(57) ABSTRACT

An energy cable includes at least one electrical conductor and at least one extruded coating layer including a thermoplastic polymer material in admixture with a dielectric fluid, wherein the dielectric fluid includes a compound of formula (I): X-A-X'; where A is a monocyclic aromatic moiety or an at least partially aromatic condensed polycyclic moiety; and at least one of X and X' is methyl or an aliphatic moiety, in both cases optionally substituted with and/or interrupted by one or more of keto, alkoxy, alkylthio, mercapto, hydroxyalkyl, hydroxyl; the other being hydrogen; the compound having a ratio of number of aromatic carbon atoms to total number of carbon atoms greater than or equal to 0.6.

21 Claims, 1 Drawing Sheet

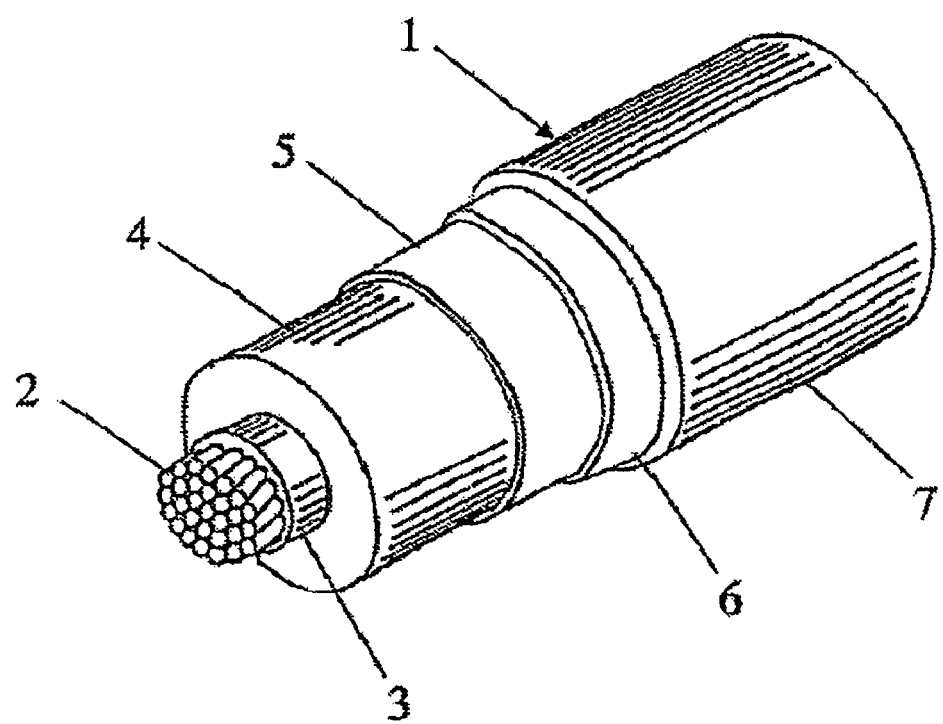

ENERGY CABLE

CROSS REFERENCE TO RELATED APPLICATION

This application is a national phase application based on PCT/EP2006/068526, filed Nov. 15, 2006, the content of which is incorporated herein by reference.

BACKGROUND OF THE INVENTION

1. Field of the Invention

The present invention relates to an energy cable. In particular, the invention relates to a cable for transporting or distributing medium or high voltage electric energy, wherein an extruded coating layer based on a thermoplastic polymer material in admixture with a dielectric fluid is present, enabling, in particular, the use of high operating temperatures together and providing the cable with the required thermomechanical properties.

Said cable may be used for both direct current (DC) or alternating current (AC) transmission or distribution.

2. Description of the Related Art

The use of materials compatible with the environment during production or utilization, easily recyclable at the end of their life, is conditioned by the need to limit costs while, for the more common uses, providing a performance equal to or better than that of conventional materials.

In the case of cables for transporting medium and high voltage energy, the various coatings surrounding the conductor commonly are based on polyolefin-based crosslinked polymer, in particular crosslinked polyethylene (XLPE), or elastomeric ethylene/propylene (EPR) or ethylene/propylene/diene (EPDM) copolymers, crosslinked too. The crosslinking, carried out after the step of extrusion of the polymeric material onto the conductor, gives the material satisfactory mechanical and electrical properties even under high temperatures both during continuous use and with current overload.

However, crosslinked materials cannot be generally recycled, so that manufacturing wastes and coating material of cables at the end of their life may be disposed of only by incineration.

Thermoplastic polyethylene (either LDPE or HDPE) was considered for use in medium and high voltage cables, but such polymeric material shows too low an operating temperature (generally about 70° C.).

Polypropylene based thermoplastic materials were considered. In particular, in order to achieve the desired performances, especially in term od dielectric strength and processability, polypropylene materials were considered in admixture with a dielectric fluid.

As reported, for example, by WO02/03398, the addition of a dielectric liquid to an insulating material should both determine a significant increase in its electrical properties (in particular the dielectric strength), without changing the material characteristics (thermomechanical properties, flexibility) and without resulting in exudation of the dielectric liquid. In particular, the resultant cable should provide substantially constant performance with time and hence high reliability, even at high operating temperatures (at least 90° C. and beyond).

WO02/03398 in the Applicants name relates to a cable comprising at least one electrical conductor and at least one extruded coating layer based on a thermoplastic polymer material in admixture with a dielectric liquid, wherein the dielectric liquid comprises at least one alkylaryl hydrocarbon having at least two non-condensed aromatic rings and a ratio of number of aryl carbon atoms to total number of carbon atoms greater than or equal to 0.6, preferably greater than or equal to 0.7. The exemplified compounds have molecular weight higher than 200 g/mole.

WO02/27731 in the Applicants name relates to a cable comprising at least one electrical conductor and at least one extruded coating layer based on a thermoplastic polymer material in admixture with a dielectric liquid, wherein the dielectric liquid comprises at least one diphenyl ether, non-substituted or substituted with at least one linear or branched, aliphatic, aromatic or mixed aliphatic and aromatic $C_1$-$C_{30}$, preferably $C_1$-$C_{24}$, hydrocarbon radical.

Said dielectric liquid has a ratio of number of aryl carbon atoms to number of total carbon atoms greater than or equal to 0.4, preferably greater than or equal to 0.7.

WO04/066318 in the Applicants name refers to a cable comprising at least one electrical conductor and at least one extruded coating layer based on a thermoplastic polymer material in admixture with a dielectric liquid, wherein said dielectric liquid has the following characteristics:

- an amount of polar compounds lower than or equal to 2.5% by weight with respect to the total weight of the dielectric liquid;
- a melting point or a pour point lower than 80° C.;
- a ratio of number of aromatic carbon atoms with respect to the total number of carbon atoms lower than 0.6, when the dielectric liquid is aromatic.

SUMMARY OF THE INVENTION

The Applicant has now found a chemical class of compounds capable of providing the polymer material for power cable layer with the sought electrical and thermomechanical characteristics.

According to a first aspect, the present invention relates to an energy cable comprising at least one electrical conductor and at least one extruded coating layer including a thermoplastic polymer material in admixture with a dielectric fluid, wherein said dielectric fluid comprises a compound of formula (I)

$$X\text{-}A\text{-}X' \qquad (I)$$

wherein A is a monocyclic aromatic moiety or an at least partially aromatic condensed polycyclic moiety; and at least one of X and X' is methyl or an aliphatic moiety, in both the cases optionally substituted with and/or interrupted by one or more of keto, alkoxy, alkylthio, mercapto, hydroxyalkyl, hydroxyl; the other being hydrogen;

said compound having a ratio of number of aromatic carbon atoms to total number of carbon atoms greater than or equal to 0.6.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description and claims, the term "in admixture" means that the thermoplastic polymer material and the dielectric fluid are mixed together to provide a substantially homogeneous dispersion of the fluid into the polymer matrix (single phase). Unless otherwise indicate, the % by weight amount are referred to the weight of such single phase.

In the present description and in the subsequent claims, as "conductor" it is meant a conducting element as such, of elongated shape and preferably of a metallic material, either in rod or in multi-wire form, more preferably aluminium or copper, or a conducting element as before coated with a semiconductive layer.

In the present description an claims, as "layer" it is meant a polymer based layer surrounding the conductor, for example, an electrically insulating layer, a semiconductive layer, a sheath, a protective layer, said protective layer being optionally foamed, a water blocking layer, or a layer performing combined functions, for example, a protective layer charged with a conductive filler.

For the purposes of the invention the term "medium voltage" generally means a voltage of between 1 kV and 35 kV, whereas "high voltage" means voltages higher than 35 kV.

As "electrically insulating layer" it is meant a layer made of a material having insulating properties, namely a having a dielectric rigidity of at least 5 kV/mm, preferably greater than 10 kV/mm.

As "semiconductive layer" it is meant a layer made of a material having semiconductive properties, namely a volumetric resistivity value, at room temperature, of less than 500 Ω·m, preferably less than 20 Ω·m. such as. For example, the material can be a polymeric matrix added with carbon black. Typically, the amount of carbon black can range between 1 and 50% by weight, preferably between 3 and 30% by weight, relative to the weight of the polymer.

The saturation concentration of the dielectric fluid in the thermoplastic polymer material may be determined by a fluid absorption method on Dumbell samples: further details regarding said method will be described in the examples given hereinbelow.

The ratio of number of aromatic carbon atoms with respect to the total number of carbon atoms may be determined according to ASTM standard D3238-95 (2000)e1.

As dielectric constant is herein intended the ratio of the amount of stored electrical energy when a potential is applied to a material, relative to the permittivity of the vacuum. It is measured in accordance with IEC 247.

The melting point may be determined by known techniques such as, for example, by Differential Scanning Calorimetry (DSC) analysis.

The pour point may be determined according to ASTM standard D97-02.

The melting enthalpy ($\Delta H_m$) can be determined by Differential Scanning Calorimetry (DSC) analysis.

According to a first embodiment, the extruded layer based on said thermoplastic polymer material in admixture with said dielectric fluid is an electrically insulating layer.

According to a further embodiment, the extruded layer based on said thermoplastic polymer material in admixture with said dielectric fluid is a semiconductive layer.

The possibility to use the same type of polymer composition for both the insulating layer and the semiconductive layers is particularly advantageous in producing cables for medium or high voltage, in that it ensures excellent adhesion between adjacent layers and hence better electrical behaviour, particularly at the interface between the insulating layer and the inner semiconductive layer, where the electrical field and hence the risk of partial discharges are higher.

According to a preferred embodiment of the invention, the compound of the dielectric fluid has a formula (I) wherein A is a monocyclic aromatic moiety or a totally aromatic condensed polycyclic moiety. Preferably, A is a condensed bicyclic moiety.

The aromatic monocyclic moiety or the at least partially aromatic polycyclic moiety according to the invention can be or comprise cyclopentanoid or cyclohexanoid.

As cyclopentanoid it is herein meant a moiety whose key structural unit consists of five atoms arranged in a ring.

As cyclohexanoid it is herein meant a moiety whose key structural unit consists of six atoms arranged in a ring.

The monocyclic or polycyclic moieties according to the invention can be of carbon atoms optionally replaced by one heteroatom selected from oxygen, sulfur or nitrogen. Preferably all of the atoms in the cycles are carbon atoms.

According to another preferred embodiment of the invention, the compound of the dielectric fluid has a formula (I) wherein least one of X and X' is methyl or an aliphatic moiety.

The number of aliphatic carbon atoms is related to the number of aromatic carbon atoms in order to comply the requirement of a ratio of number of aromatic carbon atoms to total number of carbon atoms greater than or equal to 0.6. For example, when A is a monocyclic aromatic moiety, the number of aliphatic carbon atoms according with X+X' could varies from 2 to 4. When A is a bicyclic moiety, the number of aliphatic carbon atoms according with X+X' could varies from 2 to 6. When A is a tricyclic moiety, the number of aliphatic carbon atoms according with X could varies from 2 to 9.

Preferably, X+X' is a $C_2$-$C_9$ aliphatic moiety, more preferably a $C_2$-$C_6$ alkyl chain, linear or branched.

The use of a dielectric fluid contributes to increase the breakdown strength of the coating layer. For example, it has been found that the use of a dielectric fluid as described in the following enables to increase the breakdown strength of a polypropylene based insulating layer from about 30 kV/mm in absence of dielectric fluid, up to more than 50 kV/mm, and values over 80 kV/mm have been also achieved.

Preferably, a suitable dielectric has a breakdown strength of at least 3 kV/mm, more preferably higher than 9 kV/mm.

A suitable dielectric fluid is compatible with the thermoplastic polymer material. "Compatible" means that the chemical composition of the fluid and of the thermoplastic polymer material are such as to result into a microscopically homogeneous dispersion of the dielectric fluid in the polymer material upon mixture of the fluid into the polymer, similarly to a plasticizer.

For example, the compound of the dielectric fluid is selected from n-pentylnaphthalene, iso-pentylnaphthalene, n-butylnaphthalene, i-butylnaphthalene, ter-butylnaphthalene, n-propylnaphthalene, iso-propylnaphthalene, diethylnaphthalene, trimethylnaphthalene, metil-n-butylnaphthalene, methyl-ter-butylnaphthalene, n-butoxynaphthalene, diethoxynaphthalene, naphthyl-ethylketone, naphthyl-butylketone.

These compounds can be even solid in pure form at room temperature, but they are used in fluid state thanks to mixing different isomers.

Advantageously, the compound of the dielectric fluid has a molecular weight equal to or lower than 200 g/mole.

Advantageously, the dielectric fluid has a dielectric constant, at 25° C., equal to or lower than 3.5, more preferably lower than 3 (measured in accordance with IEC 247).

Advantageously, the boiling point of the dielectric fluid should be higher than the temperature that the cable could reach during operation and overcurrent. Preferably, the boiling point of the dielectric fluid is higher than 130° C., more preferably higher than 250° C.

Preferably the dielectric fluid is admixed with the thermoplastic polymer material in amounts lower than the saturation concentration of the dielectric fluid in the thermoplastic polymer material. Said amounts, specified in the following, do not impair the thermomechanical characteristics of the coating layer and avoid the exudation of said dielectric fluid from the thermoplastic polymer material.

The weight ratio of dielectric fluid to thermoplastic polymer material of the present invention is generally of from 1:99 to 25:75, preferably of from 5:95 to 15:85.

The Applicant observed that a content of dielectric fluid higher than a certain value does not provide substantial increases of the dielectric strength imparted to the polymer material. In some instances, a relatively high content of dielectric fluid has been found to give rise to drawbacks also in the manufacturing stage, or otherwise to impair the thermomechanical performance of the cable.

It is herein pointed out that the use of a dielectric fluid with a relatively low melting point or low pour point (e.g. a melting point or a pour point not higher than 80° C.) allows an easy handling of the dielectric fluid which may be melted with no need of additional and complex manufacturing steps (e.g. a melting step of the dielectric fluid) and/or apparatuses for admixing the fluid with the polymer material.

According to a further preferred embodiment, the dielectric fluid has a melting point or a pour point of from −130° C. to +80° C.

Advantageously, the dielectric fluid has a predetermined viscosity in order to prevent fast diffusion of the fluid within the insulating layer and hence its outward migration, as well as to enable the dielectric fluid to be easily fed and mixed into the thermoplastic polymer material. Preferably, the dielectric fluid of the invention has a viscosity, at 40° C., of from 5 cst to 500 cSt, preferably of from 10 cst to 300 cSt (measured according to ASTM standard D445-03).

According to a preferred embodiment of the invention, the thermoplastic polymer material for the cable of the invention is selected from:

(a) at least one propylene homopolymer or at least one copolymer of propylene with at least one olefin comonomer selected from ethylene and an α-olefin other than propylene, said homopolymer or copolymer having a melting point greater than or equal to 130° C. and a melting enthalpy of from 20 J/g to 100 J/g;

(b) a mechanical mixture comprising at least one propylene homopolymer or copolymer (a) and (c) at least one elastomeric copolymer of ethylene with at least one aliphatic α-olefin, and optionally a polyene;

(d) at least 75% by weight, with respect to the total weight of the thermoplastic polymer material, of at least one copolymer of at least two α-olefin comonomers, said copolymer having a melting enthalpy lower than 25 J/g ($d_1$); and an amount equal to or less than 25% by weight with respect to the total weight of the thermoplastic polymer material of (a) or of at least one propylene homopolymer or propylene copolymer with at least one α-olefin, said at least one propylene homopolymer or propylene copolymer having a melting enthalpy higher than 25 J/g and a melting point higher than 130° C. ($d_2$)

The polymer material d) is preferred according to the present invention.

The polymer material d) is such as to provide a layer of a thermoplastic polymeric material having a melting enthalpy equal to or lower than 40 J/g. Preferably, said melting enthalpy equal to or lower than 35 J/g, and more preferably of from 30 to 5 J/g.

Advantageously, the layer is based on a material having a melt flow index (MFI), measured at 230° C. with a load of 21.6 N according to ASTM standard D1238-00, of from 0.05 dg/min to 10.0 dg/min, more preferably from 0.4 dg/min to 5.0 dg/min.

Preferably, the copolymer ($d_1$) is present in an amount of from 80% by weight to 95% by weight with respect to the total weight of the thermoplastic polymer material.

Preferably, the copolymer ($d_1$) has a melting enthalpy from 15 J/g to 10 J/g. The melting enthalpy of the copolymer ($d_1$) can also be lower than 10 J/g, for example 0 J/g.

Advantageously, the copolymer ($d_1$) has a flexural modulus of from 80 MPa to 10 MPa, more preferably of from 40 MPa to 20 MPa. The flexural modulus of the copolymer (a) can also be lower than 10 MPa, for example 1 MPa.

The at least two α-olefin comonomers of the at least one copolymer ($d_1$) can be selected from ethylene or an α-olefin of formula $CH_2=CH-R$, where R is a linear or branched $C_1$-$C_{10}$ alkyl, selected, for example, from: propylene, 1-butene, 1-pentene, 4-methyl-1-pentene, 1-hexene, 1-octene, 1-decene, 1-dodecene, preferably from ethylene, propylene, butene and octene.

Propylene/ethylene copolymers are particularly preferred.

Preferably, at least one of the at least two α-olefin comonomers is propylene.

The copolymer ($d_1$) for the cable of the invention can be a random copolymer or a heterophase copolymer.

As "random copolymer" is herein meant a copolymer in which the monomers are randomly distributed across the polymer chain.

As "heterophase copolymer" is herein meant a copolymer in which elastomeric domains, e.g. of ethylene-propylene elastomer (EPR) are formed and dispersed in a homopolymeric or copolymeric matrix.

Preferably, the copolymer ($d_1$) is selected from:

($d_{1a}$) a random copolymer of propylene with at least one comonomer selected from ethylene and an α-olefin other than propylene;

($d_{1b}$) a heterophase copolymer comprising a thermoplastic phase based on propylene and an elastomeric phase based on ethylene copolymerized with an α-olefin, preferably with propylene, in which the elastomeric phase is preferably present in an amount of at least 45 wt % with respect to the total weight of the heterophase copolymer.

Particularly preferred of said class ($d_{1a}$) is copolymer of propylene with at least one olefin comonomer selected from ethylene and an α-olefin other than propylene.

For example, heterophase copolymers of class ($d_{1b}$) are obtained by sequential copolymerization of: i) propylene, possibly containing minor quantities of at least one olefin comonomer selected from ethylene and an α-olefin other than propylene; and then of: ii) a mixture of ethylene with an α-olefin, in particular propylene, and possibly with minor portions of a diene.

Examples of products of class ($d_{1a}$) available commercially are Vistalon™ 404, Vistalon™ 606, Vistalon™ 805 (Exxon Chemicals).

Examples of products of products of class ($d_{1b}$) available commercially are Softell® CA02A; Hifax® CA07A; Hifax® CA10A (all from Basell).

According to one preferred embodiment, the propylene homopolymer or propylene copolymer with at least one α-olefin ($d_2$) has a melting enthalpy higher than 30 J/g, more preferably of from 50 to 80 J/g.

In (d), the quantity of said propylene homopolymer or propylene copolymer ($d_2$) is preferably of from 5% by weight to 20% by weight with respect to the total weight of the thermoplastic base material.

According to one preferred embodiment, $(d_2)$ has a melting point of from 140° C. to 170° C.

Advantageously, the homopolymer or copolymer $(d_2)$ has a flexural modulus equal to or higher than 100 MPa, more preferably of from 200 MPa to 1,500 MPa.

According to one preferred embodiment, the cable of the invention has at least one extruded coating layer with electrical insulation properties formed from the thermoplastic polymer material in admixture with the dielectric fluid as from above.

According to a further preferred embodiment, the cable of the invention has at least one extruded coating layer with semiconductive properties formed from the thermoplastic polymer material in admixture with the dielectric fluid as from above. To form a semiconductive layer, a conductive filler is generally added to the polymer material. To ensure a suitable dispersion of the conductive filler within the thermoplastic polymer material, the latter is preferably selected from propylene homopolymers or copolymers comprising at least 40 wt % of amorphous phase, with respect to the total polymer weight.

The possibility to use the same type of polymer composition for both the insulating layer and the semiconductive layers is particularly advantageous in producing cables for medium or high voltage, in that it ensures excellent adhesion between adjacent layers and hence better electrical behaviour, particularly at the interface between the insulating layer and the inner semiconductive layer, where the electrical field and hence the risk of partial discharges are higher.

In forming a coating layer for the cable of the invention, other conventional components may be added to the aforedefined polymer composition, such as antioxidants, processing aids, water tree retardants, or mixtures thereof.

Conventional antioxidants suitable for the purpose are, for example, distearyl- or dilauryl-thiopropionate and pentaerythrityl-tetrakis [3-(3,5-di-t-butyl-4-hydroxyphenyl)propionate], or mixtures thereof.

Processing aids which may be added to the polymer composition include, for example, calcium stearate, zinc stearate, stearic acid, or mixtures thereof.

With particular reference to medium and high voltage cables, the polymer materials as defined hereinabove may be advantageously used to obtain an insulating layer. The resistance to thermopressure attained by coating insulating layer as from the present invention allows medium voltage and high voltage power cables comprising them to operate at 90° C. or more without performance impairing.

If the coating layer of the present invention is a semiconductive layer, a conductive filler, in particular carbon black, is generally dispersed within the polymer base material in a quantity such as to provide the material with semiconductive characteristics (i.e. such as to obtain a resistivity of less than 5 Ohm·m at ambient temperature). This amount is generally between 5 wt % and 80 wt %, and preferably between 10 wt % and 50 wt %, of the total weight of the mixture.

The use of the same base polymer composition for both the insulating layer and the semiconductive layers is particularly advantageous in producing cables for medium or high voltage, in that it ensures excellent adhesion between adjacent layers and hence a good electrical behaviour, particularly at the interface between the insulating layer and the inner semiconductive layer, where the electrical field and hence the risk of partial discharges are higher.

The composition for the layer of the power cable of the invention may be prepared by mixing together the thermoplastic polymer material, the dielectric fluid and any other additives possibly present by using methods known in the art.

Mixing may be carried out for example by an internal mixer of the type with tangential rotors (Banbury) or with interpenetrating rotors; in a continuous mixer of Ko-Kneader (Buss) type, of co- or counter-rotating double-screw type; or in a single screw extruder.

The thermoplastic polymer material may be previously manufactured in a polymerization reactor or by feeding the thermoplastic material together with the dielectric fluid into the mixing apparatus for the polymer composition as exemplified just above.

Alternatively, the dielectric fluid of the present invention may be added to the thermoplastic polymer material during the extrusion step by direct injection into the extruder cylinder as disclosed, for example, in International Patent Application WO02/47092 in the name of the Applicant.

Greater compatibility has also been found between the dielectric fluid and the thermoplastic polymer material of the present invention than in the case of similar mixtures of the same polymer material with other dielectric fluids known in the art. This greater compatibility leads, inter alia, to less exudation of the dielectric fluid. Due to their high operating temperature and their low dielectric losses, the cables of the invention can carry, for the same voltage, a power at least equal to or even greater than that transportable by a traditional cable with XLPE coating.

Although this description is mainly focused on the production of cables for transporting or distributing medium or high voltage energy, the polymer composition of the invention may be used for coating electrical devices in general and in particular cables of different type, for example low voltage cables (i.e. cables carrying a voltage less than 1 kV), telecommunications cables or combined energy/telecommunications cables, or accessories used in electrical lines, such as terminals, joints, connectors or the like.

BRIEF DESCRIPTION OF THE DRAWING

Further characteristics will be apparent from the detailed description given hereinafter with reference to the accompanying drawing, in which:

FIG. 1 is a perspective view of an electric cable, particularly suitable for medium or high voltage, according to the invention.

DETAILED DESCRIPTION OF THE INVENTION

In FIG. 1, the cable (1) comprises a conductor (2), an inner layer with semiconductive properties (3), an intermediate layer with insulating properties (4), an outer layer with semiconductive properties (5), a metal screen (6), and an outer sheath (7).

The conductor (2) generally consists of metal wires, preferably of copper or aluminium, stranded together by conventional methods, or of a solid aluminium or copper rod. At least one coating layer selected from the insulating layer (4) and the semiconductive layers (3) and (5) comprises the composition of the invention as heretofore defined. Around the outer semiconductive layer (5) there is usually positioned a screen (6), generally of electrically conducting wires or strips helically wound. This screen is then covered by a sheath (7) of a thermoplastic material such as, for example, non-crosslinked polyethylene (PE).

The cable can be also provided with a protective structure (not shown in FIG. 1) the main purpose of which is to mechanically protect the cable against impacts or compressions. This protective structure may be, for example, a metal reinforcement or a layer of expanded polymer as described in WO 98/52197 in the name of the Applicant.

FIG. 1 shows an embodiment of a cable according to the invention. Suitable modifications can be made to this embodiment according to specific technical needs and application requirements without departing from the scope of the invention.

The cable coating layer or layers of thermoplastic material according to the present invention may be manufactured in accordance with known methods, for example by extrusion. The extrusion is advantageously carried out in a single pass, for example by the tandem method in which individual extruders are arranged in series, or by co-extrusion with a multiple extrusion head.

The following examples illustrate the invention without limiting it.

EXAMPLES

Cables provided with an insulating layer according to the invention or with a comparative insulating layer were prepared from the following components:

Adflex™ Q200F: propylene heterophase copolymer with melting point 165° C., melting enthalpy 30 J/g, MFI 0.8 dg/min and flexural modulus 150 MPa (commercial product of Basell);

Synesstic™ 5: alkylated naphthalene with a molecular weight of 198 g/mole; ratio $C_{arom}/C_{tot}$=0.67; viscosity=29 cSt (at 40° C.); pour point=−39° C. (commercial product of ExxonMobil Chemical);

Synesstic™ 12: alkylated naphthalene with a molecular weight of 296 g/mole; ratio $C_{arom}/C_{tot}$=0.45; viscosity=109 cSt (at 40° C.) (commercial product of Exxon-Mobil Chemical);

Palatinol AH: dioctyl-phthalate with a molecular weight of 391 g/mole; ratio $C_{arom}/C_{tot}$=0.25 (commercial product of BASF).

In all of the examples, the Adflex™ Q 200 F was fed directly into the extruder hopper. Subsequently, a dielectric fluid, previously mixed with the antioxidants, was injected at high pressure into the extruder. An extruder having a diameter of 80 mm and an L/D ratio of 25 was used. The injection was made during the extrusion at about 20 D from the beginning of the extruder screw by means of three injections point on the same cross-section at 120° from each other. The dielectric fluid was injected at a temperature of 70° C. and a pressure of 250 bar.

Cable A was manufactured using an amount of 5% by weight of Synesstic™ 5.

Cable B was manufactured using an amount of 10% by weight of Synesstic™ 5.

Comparison cable C was manufactured using an amount of 5% by weight of Synesstic™ 12.

Comparison cable D was manufactured using an amount of 5% by weight of Palatinol AH.

Under similar conditions, a comparison cable E was produced without adding dielectric fluid to the Adflex™ Q 200 F base material.

Each cable leaving the extrusion head was cooled to room temperature by passing through cold water.

Each finished cable consisted of an aluminum conductor (cross-section 150 mm²), an inner semiconductive layer of about 0.5 mm in thickness, an insulating layer of about 4.5 mm in thickness and finally an outer semiconductive layer of about 0.5 mm in thickness.

Dielectric Strength

Three pieces (each being 20 meter-long) of cables A, B and C produced as described above were subjected to dielectric strength measurement using alternating current at ambient temperature. Starting from 100 kV the gradient applied to the cables was increased by 10 kV every 10 minutes until the cables broke down. The break down gradient considered is that on the conductor.

Table 1 summarizes the results of the electrical tests: the data represent the average value obtained from three different measurements.

TABLE 1

| Cable | Dielectric strength |
|-------|---------------------|
| A | +142% |
| B | +155% |
| C | +126% |
| D | +103% |
| E | 100% |

As appears from Table 1, comparative dielectric fluids admixed into the thermoplastic polymer material at the same concentration of those of the invention provided the insulating layer with a dielectric strength values lower than those provided by the dielectric fluids of the invention.

The dielectric fluids according to the invention substantially increase the dielectric strength of a thermoplastic insulating layer for power cable.

It has been observed that an amount of 5% by weight of a dielectric fluid according to the invention admixed with the thermoplastic polymer material provided a significant increase of dielectric strength. a further increase of such amount provided a further benefit.

However, it has been observed that an excessively high amount of dielectric fluid (e.g. higher than 30% by weight in the case of Synesstic™ 5 can:

decrease the dielectric strength of the thermoplastic polymer material;

impair the thermomechanical properties of the coating layer;

exudate out of the cable in operation, with a loss of dielectric performance.

The invention claimed is:

1. An energy cable comprising at least one electrical conductor and at least one extruded coating layer comprising a thermoplastic polymer material in admixture with a dielectric fluid, wherein said dielectric fluid comprises:

a compound of formula (I)

    (I)

wherein A is a monocyclic aromatic moiety or an at least partially aromatic condensed polycyclic moiety; and one of X and X' is methyl or an aliphatic moiety, in both cases optionally substituted with and/or interrupted by one or more of keto, alkoxy, alkylthio, mercapto, hydroxyalkyl, hydroxyl; the other one of X and X' being hydrogen, said compound having a ratio of number of aromatic carbon atoms to total number of carbon atoms greater than or equal to 0.6.

2. The energy cable according to claim 1, wherein the extruded layer is an electrically insulating layer.

3. The energy cable according to claim 1, wherein the extruded layer is a semiconductive layer.

4. The energy cable according to claim 1, wherein the compound of the dielectric fluid has a formula (I), wherein A is a monocyclic aromatic moiety or a totally aromatic condensed polycyclic moiety.

5. The energy cable according to claim 4 wherein the compound of the dielectric fluid has a formula (I), wherein A is a condensed bicyclic moiety.

6. The energy cable according to claim 1, wherein the monocyclic aromatic moiety is a cyclopentanoid or a cyclohexanoid.

7. The energy cable according to claim 1, wherein the at least partially aromatic condensed polycyclic moiety comprises cyclopentanoid, cyclohexanoid or both.

8. The energy cable according to claim 1, wherein A comprises one heteroatom selected from oxygen, sulfur or nitrogen.

9. The energy cable according to claim 1, wherein the compound of the dielectric fluid has a formula (I) wherein one of X and X' is a methyl or an aliphatic moiety.

10. The energy cable according to claim 1, wherein the compound of the dielectric fluid is selectd from n-pentylnaphthalene, iso-pentylnaphthalene, nbutylnaphthalene, i-butylnaphthalene, ter-butylnaphthalene, n-propylnaphthalene, isopropylnaphthalene, diethylnaphthalene, trimethylnaphthalene, methyl-nbutylnaphthalene, methyl-ter-butylnaphthalene, n-butoxynaphthalene, diethoxynaphthalene, naphthyl-ethylketone, and naphthyl-butylketone.

11. The energy cable according to claim 1, wherein the compound of the dielectric fluid has a molecular weight equal to or lower than 200 g/mole.

12. The energy cable according to claim 1, wherein the dielectric fluid has a dielectric constant, at 25° C., equal to or lower than 3.5.

13. The energy cable according to claim 1, wherein the dielectric fluid has a boiling point higher than 130° C.

14. The energy cable according to claim 1, wherein the dielectric fluid is admixed with the thermoplastic polymer material in a weight ratio of 1:99 to 25:75.

15. The energy cable according to claim 1, wherein the dielectric fluid has a melting point or a pour point of −130° C. to +80° C.

16. The energy cable according to claim 1, wherein the dielectric fluid has a viscosity, at 40° C., of 5 cst to 500 cSt.

17. The energy cable according to claim 16, wherein the dielectric fluid has a viscosity, at 40° C. of 10 cst to 300 cSt.

18. The energy cable according to claim 1, wherein the thermoplastic polymer material is selected from:
(a) at least one propylene homopolymer or at least one copolymer of propylene with at least one olefin comonomer selected from ethylene and an α-olefin other than propylene, said homopolymer or copolymer having a melting point greater than or equal to 130° C. and a melting enthalpy of 20 J/g to 100 J/g;
(b) a mechanical mixture comprising at least one propylene homopolymer or copolymer (a) and
(c) at least one elastomeric copolymer of ethylene with at least one aliphatic α-olefin, or a polyene; and
(d) at least 75% by weight, with respect to the total weight of the thermoplastic polymer material, of at least one copolymer of at least two α-olefin comonomers, said copolymer having a melting enthalpy lower than 25 J/g ($d_1$); and an amount equal to or less than 25% by weight with respect to the total weight of the thermoplastic polymer material of (a) or of at least one propylene homopolymer or propylene copolymer with at least one α-olefin, said at least one propylene homopolymer or propylene copolymer having a melting enthalpy higher than 25 J/g and a melting point higher than 130° C. ($d_2$).

19. The energy cable according to claim 18, wherein the thermoplastic polymer material is at least 75% by weight, with respect to the total weight of the thermoplastic polymer material, of at least one copolymer of at least two α-olefin comonomers, said copolymer having a melting enthalpy lower than 25 J/g ($d_1$); and an amount equal to or less than 25% by weight with respect to the total weight of the thermoplastic polymer material of (a) or of at least one propylene homopolymer or propylene copolymer with at least one α-olefin, said at least one propylene homopolymer or propylene copolymer having a melting enthalpy higher than 25 J/g and a melting point higher than 130° C. ($d_2$).

20. The energy cable according to claim 18, wherein the copolymer ($d_1$) is present in an amount of 80% by weight to 95% by weight with respect to the total weight of the thermoplastic polymer material.

21. The energy cable according to claim 18, wherein the copolymer ($d_1$) has a melting enthalpy of 15 J/g to 10 J/g.

* * * * *

UNITED STATES PATENT AND TRADEMARK OFFICE
CERTIFICATE OF CORRECTION

| | | |
|---|---|---|
| PATENT NO. | : 8,378,216 B2 | Page 1 of 1 |
| APPLICATION NO. | : 12/312464 | |
| DATED | : February 19, 2013 | |
| INVENTOR(S) | : Perego et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 949 days.

Signed and Sealed this
Twenty-seventh Day of January, 2015

Michelle K. Lee
*Deputy Director of the United States Patent and Trademark Office*